(12) United States Patent
Tedesco et al.

(10) Patent No.: US 6,898,570 B1
(45) Date of Patent: May 24, 2005

(54) BILLING STATEMENT CUSTOMER ACQUISTION SYSTEM

(75) Inventors: Daniel E. Tedesco, New Canaan, CT (US); James A Jorasch, Stamford, CT (US); Jay S. Walker, Ridgefield, CT (US)

(73) Assignee: Walker Digital, LLC, Stamford, CT (US)

( * ) Notice: Subject to any disclaimer, the term of this patent is extended or adjusted under 35 U.S.C. 154(b) by 0 days.

(21) Appl. No.: 09/100,684

(22) Filed: Jun. 19, 1998

Related U.S. Application Data

(63) Continuation-in-part of application No. 08/982,149, filed on Dec. 1, 1997, now Pat. No. 6,196,458.

(51) Int. Cl.[7] .......................... G06F 17/60; G06F 17/00
(52) U.S. Cl. .......................................... 705/14; 705/40
(58) Field of Search .............................. 705/14, 40, 10; 235/379, 380, 381

(56) References Cited

U.S. PATENT DOCUMENTS

| | | | |
|---|---|---|---|
| 4,484,733 A | 11/1984 | Loos et al. ................... 220/54 |
| 4,491,725 A | 1/1985 | Pritchard | |
| 4,667,292 A | 5/1987 | Mohlenbrock et al. | |
| 4,750,119 A | 6/1988 | Cohen et al. | |
| 4,833,308 A | 5/1989 | Humble | |
| 4,982,346 A | 1/1991 | Girouard et al. | |
| 5,003,384 A | 3/1991 | Durden et al. ................. 358/84 |
| 5,025,372 A | 6/1991 | Burton et al. | |
| 5,060,165 A | 10/1991 | Schumacher et al. ....... 364/478 |
| 5,173,851 A | * 12/1992 | Off et al. ...................... 705/14 |
| 5,200,889 A | * 4/1993 | Mori ........................... 705/14 |
| RE34,380 E | 9/1993 | Sleevi | |
| 5,287,268 A | 2/1994 | McCarthy | |
| 5,297,026 A | 3/1994 | Hoffman | |
| 5,319,542 A | 6/1994 | King, Jr. et al. | |

(Continued)

FOREIGN PATENT DOCUMENTS

| | | | |
|---|---|---|---|
| EP | 0 607 686 A2 | 7/1994 | ............. B07C/1/00 |
| JP | 5-257950 | * 10/1993 | ........... G06F/15/21 |
| JP | 10-187318 | * 7/1998 | ............. G06F/3/02 |
| WO | WO 96/31848 | 10/1996 | |
| WO | WO 98/06050 | 2/1998 | |

OTHER PUBLICATIONS

Krauss, Jeffrey, "Subsidized TV Sets?", CED pp 1–3, Feb. 1998.*

(Continued)

*Primary Examiner*—James W. Myhre
(74) *Attorney, Agent, or Firm*—Dean P. Alderucci

(57) ABSTRACT

A customer acquisition system is disclosed that allows an offeror service provider to acquire new customers by making acquisition offers to customers through the billing statements of other businesses ("billing statement issuers"). An "acquisition offer" is an offer by the offeror service provider to pay an amount owed by the customer to the billing statement issuer, or a portion thereof, provided the customer agrees to become a customer of the offeror service provider. Predetermined criteria are used to automatically include an acquisition offer for eligible potential new customers of the offeror service provider with a billing statement or on associated promotional materials, and allows the customer to accept the acquisition offer using the billing statement. The customer acquisition system optionally ensures that the customer is not an existing customer of the offeror service provider before extending an acquisition offer. The acquisition offers can be tailored to the amount owed by the customer, and targeted to customers based on financial, geographic or historical data.

13 Claims, 9 Drawing Sheets

U.S. PATENT DOCUMENTS

| | | | |
|---|---|---|---|
| 5,333,186 A | 7/1994 | Gupta | |
| 5,367,450 A | 11/1994 | Pintsov | 364/401 |
| 5,380,991 A | 1/1995 | Valencia et al. | |
| 5,420,606 A | 5/1995 | Begum et al. | |
| 5,515,270 A | 5/1996 | Weinblatt | |
| 5,537,314 A | 7/1996 | Kanter | 364/406 |
| 5,619,558 A | 4/1997 | Jheeta | |
| 5,636,346 A | 6/1997 | Saxe | |
| 5,652,784 A | 7/1997 | Blen et al. | |
| 5,655,089 A | 8/1997 | Bucci | 395/240 |
| 5,684,965 A | 11/1997 | Pickering | |
| 5,687,322 A | 11/1997 | Deaton et al. | |
| 5,694,551 A | 12/1997 | Doyle et al. | |
| 5,710,884 A | 1/1998 | Dedrick | |
| 5,717,860 A | 2/1998 | Graber et al. | |
| 5,721,827 A | 2/1998 | Logan et al. | |
| 5,724,521 A | 3/1998 | Dedrick | |
| 5,724,525 A * | 3/1998 | Beyers, II et al. | 705/40 |
| 5,727,153 A | 3/1998 | Powell | |
| 5,729,693 A * | 3/1998 | Holda-Fleck | 705/14 |
| 5,734,838 A | 3/1998 | Robinson et al. | |
| 5,752,238 A | 5/1998 | Dedrick | |
| 5,761,647 A * | 6/1998 | Boushy | 705/10 |
| 5,761,648 A | 6/1998 | Golden | |
| 5,774,868 A | 6/1998 | Cragun et al. | |
| 5,794,210 A | 8/1998 | Goldhaber et al. | |
| 5,794,220 A | 8/1998 | Hunt | |
| 5,794,221 A | 8/1998 | Egendorf | |
| 5,806,044 A | 9/1998 | Powell | |
| 5,806,045 A | 9/1998 | Biorge et al. | |
| 5,812,769 A | 9/1998 | Graber et al. | |
| 5,819,092 A | 10/1998 | Ferguson et al. | |
| 5,822,736 A | 10/1998 | Hartman et al. | |
| 5,839,119 A | 11/1998 | Krsul et al. | |
| 5,855,008 A | 12/1998 | Goldhaber et al. | |
| 5,857,175 A | 1/1999 | Day et al. | |
| 5,864,822 A | 1/1999 | Baker, III | |
| 5,870,030 A | 2/1999 | DeLuca et al. | |
| 5,873,068 A | 2/1999 | Beaumont et al. | |
| 5,873,069 A | 2/1999 | Reuhl et al. | |
| 5,890,135 A | 3/1999 | Powell | |
| 5,923,016 A | 7/1999 | Fredregill et al. | |
| 6,026,370 A * | 2/2000 | Jermyn | 705/14 |
| 6,035,281 A * | 3/2000 | Crosskey et al. | 705/14 |

OTHER PUBLICATIONS

Goldberg, Jeff, "Making Your Wireless Quest Easier", Point.com, pp 1–5,1–2 & 1, Jan. 1998.*

Rozen, Miriam, "What's New in Joint Promotions"; The New York Times, Section 3; p. 23; col. 1; Financial Desk; Mar. 10, 1985.

Katcher, P. Royall, "Getting products to consumers; The Basics of Retailing, part 2"; Automotive MArketing, vol. 19; No. 5; p. 34; ISSN: 0193–3264; May, 1990; download date: Aug. 15, 1995. (http://web.lexis–nexis.com/In.universe/search/documentDisplay?).

Shaw, Robert, "How the Smart Card is Changing Retailing"; Long Range Planning, vol. 24, No. 1, pp. 111 to 114, 1991.

"Checkstands Boost Supermarket Profits", Chain Store Age Executive, Checkstand Design and Productivity, p. 15B–16B, Dec. 1991.

Pogoda, Dianne M., "G.E.C.C. offers credit card with discounts, rebates; General Electric Capital Corp.; Brief Article"; WWD (Women's Wear Daily); vol. 164; No. 46; p. 7; ISSN: 0149–5380; Sep. 3, 1992. (http://web.lexis–nexis.com/requester/document?).

"Set–top 'Converter'; Interactive Initiatives Abound at NCTA Convention"; Communications Daily, vol. 13, No. 111, p. 9; Jun. 10, 1993.

Mandese, Joe, "Interactive puts radio at crossroads; Out–of–home role, tapping into digital tech could ensure future"; Advertising Age, NEWS; p. 12, Oct. 25, 1993.

Kristof, Kathy, Los Angeles Times Syndicate, "Card Sharks are in Season; be Wary of Discounts and Rebates as you Shop Around for Good Credit Deals"; Chicago Tribune; Your Money; p. 9; Zone: C; Personal Finance; North Sports Final Edition; Nov. 23, 1993. (http://web/lexis–nexis.com/requester/document?).

Rosenberg, Joyce M., "GE Capital Comes to Macy's Aid Again"; AP (Associated Press) Worldstream; Financial pages; Thursday 19:42 Eastern Time, Feb. 17, 1994. (http://web.lexis–nexis.com/requester/document?).

Patch, Kimberly, "Sled, InterNIC debut Internet services; Sled Corp offers electronic coupons for encryption software; InterNIC Information Services launches InfoGuide to Internet computer network; News Digest; Brief Article; Product Announcement"; PC Week, vol. 11; No. 19; p. 130; ISSN: 0740–1604, May 16, 1994; download date: Sep. 7, 1995.

Ratchffe, Mitch, "Lucie; interactive information, advertising stands upright, prepares to walk; Information Presentation Technologies Inc's Local Use Consumer Interactive Environment"; Digital Media, No. 1, vol. 4; p. 14; ISSN: 1056–7038; Jun. 8, 1994.

Armstrong, Larry, in Arcadia, Calif, "Vons supermarkets are revolutionizing the delivery of discounts"; Business Week, Information Processing; No. 3377; p. 164; Jun. 20, 1994. (http://web.lexis–nexis.com/In.universe/search/document-Display?).

Bowles, Bob; Andreasen, Lois, "ADSI: maximizing the synergy between the network and terminals; analog display services interface"; Telephony; vol. 227; No. 9; p. 20; ISSN: 0040–2656; Aug. 29, 1994; download date: Sep. 15, 1995.

Block, Valerie, "GM Turns Up the Heat With Plan to Cross–Sell Some Financial Products"; The American Banker; Credit/Debit/ATMS; p. 16; Nov. 18, 1994, Friday. (http://web.lexis–nexis.com/requester/document?).

Wildstrom, Stephen H., "Pagers that can Spell it all Out"; Business Week; Technology and You; No. 3407; p. 16; Jan. 16, 1995; download date: Jan. 17, 1999.

Ratcliffe, Mitch, "All roads lead to Microsoft? Microsoft's 'Windows everywhere' strategy"; Digital Media, No. 10, vol. 4; p. 3; ISSN: 1056–7038; Mar. 6, 1995; download date: Feb. 8, 1999.

Schrage, Michael, "Free stuff! Predatory pricing or creative cross–promotion? You be the judge; The Beta Version; Industry Trend or Event; Column"; Information Access Company, a Thomson Corporation Company; Marketing Computers; vol. 15; No. 9; p. 24; ISSN: 0895–5697; Oct. 1995; download date: Dec. 27, 1995.

Various telecommunications–related articles in Communications Daily; vol. 16, No. 84; p. 4; May 15, 1996.

Marshall, Kyle, Staff Writer, "More phone choices ring in"; The News and Observer; Business Section, p. D1; Aug. 13, 1996, Final Edition. (http://web.lexis–nexis.com/requester/document?).

Nolle, Tom, "Overcoming cellular deja vu; personal communications services"; America's Network, No. 18, vol. 100; p. 70; ISSN: 1075–5292; Sep. 15, 1996; IAC–create date: Jan. 24, 1999; download date: Feb. 8, 1999.

Meece, Mickey, "MasterCard, Retailers Testing Point of Sale Discounts Program"; Credit/Debit/ATMS; p. 14; Sep. 24, 1996; download date: Sep. 23, 1996. (http://web.lexis–nexis.com/In.universe/search/documentDisplay?).

"Battle of the bogoff: Roderick Oram on a clash between retailers and manufactures:"; Financial Times (London); Management: Marketing and Advertising; p. 14; Oct. 24, 1996, Thrusday London Edition 1; download date: Oct. 23, 1996. (http://web.lexis–nexis.com/In.universe/search/documentDisplay?).

Wessel, Harry, Orlando Sentinel, "Rewarding Exeperience?; Credit Cards Offering Bonuses not for Everyone"; Chicago Tribune, View Related Topics, Your Money; p. 1; Zone: C; North Sports Final Edition; Nov. 4, 1996 Monday. (http://web.lexis–nexis.com/requester/document?).

"AT&T Wireless adds convenience to buying cellular service"; M2 Communications Ltd. 1996; M2 Presswire; Pittsburgh; Nov. 20, 1996; download date: May 23, 1997; IAC–create–date: Mar. 24, 1997; download date: Mar. 25, 1997. (http://web.lexis–nexis.com/requester.doc...).

Selasky, Susan, Detroit Free Press, "Easy–to–Swallow Savings; Diner Credit Cards Serve Wide Menu of Discounts"; Pittsburgh Post–Gazette; Food, p. F–2; Sooner Edition, Dec. 5, 1996, Thursday; download date: Dec. 13, 1996. (http://web.lexis–nexis.com/requester/document?).

"Merger Creates Alliance Data."; Credit Risk Management Report; vol. 6, No. 25; Dec. 16, 1996.

Higgins, Stephen, "Digital phone service on the way"; Ingersoll Publications Co. 1997; Business Dateline; New Haven Register; p. D1, Jan. 7, 1997; download date: Feb. 6, 1997. (http://web.lexis–nexis.com/requester/document?).

Beyer, Leslie, "Target marketing made easy; supermarkets"; Delta Communications Inc., Grocery Marketing; No. 2, vol. 63; p. 45; ISSN: 0888–0360; Feb., 1997. (http://web.lexis–nexis.com/In.universe/search/documentDisplay?).

Warner, Bernhard, "Ads in the Ether on PCS, Phones, Pagers (Will customers accept promo beeps?)"; Brandweek; p. 48; Mar. 31, 1997. (http/www.brandweek.com).

Barlow, Rick, "Relationship Marketing: Coalition Marketing is Coming Back"; Brandweek formerly Adweek Marketing Week: Apr. 28, 1997; download date: Apr. 30, 1997. (http://web.lexis–nexis.com/requester/document?).

"Emaginet Plans to 'Push' its Way into Consumer Mindset, Pocketbook"; Interactive PR and Marketing News; vol. 4, No. 22; May 30, 1997; download date: Jun. 6, 1997.

Gilligan, Gregory, "Credit Cards from Retailstores a Mixed Blessing for Shoppers"; The Richmond Times Dispatch; Business, p. E–1; City Edition; Jul. 20, 1997, Sunday; download Date: Jul. 22, 1997. (http://web.lexis–nexis.com/In.universe/search/documentDisplay?).

Simon, Ruth, "Make Sure Your Rebate Card Still Delivers the Goods"; The Time Inc. Magazine Company; Money; Your Money Monitor; p. 42; Aug., 1997. (http://web.lexis–nexis.com/requester/document?).

Williams, Martyn, "Internet Update" (This is a roundup of new and updated resources and services on the global Internet); Post–Newsweek Business Information Inc,; Newsbyes; Aug. 4, 1997; download date: Jul. 10, 1998. (http://web.lexis–nexis.com/In.universe/search/document-Display?).

"SNET Cellular Value Plans"; "SNET Digital Value Plans"; SNET Price Plans brochure, 1997.

Fitzgerald, Beth, "New Jersey–Based SCA Helps Private Label Credit Cards Take Off"; The Star–Ledger; KR–AC–C–NO: 19970804000025; Aug. 4, 1997, Monday; download date: Nov. 12, 1998. (http://web.lexis–nexis.com/requester/document?).

Sanders, Edmund, Orange County Register; "Tricky Business: The Magic of Rebate Cards can Quickly Disappear"; Chicago Tribune; North Sports Final Edition; Your Money; p. 1; Zone; C; Aug. 18, 1997 Monday.

Wijnen, Renee, "Cendant Eyes Cross–Marketing Opportunities; CUC International–HFS Inc. merger expected to yield an additional 2 million club members"; DM News, p. 4, Feb. 2, 1998; download date: Feb. 9, 1998. (http://web.lexis–nexis.com/requester/document?).

"Cardholders think big"; Bank Marketing International; Survey; p. 8; Mar. 1998; download date: Mar. 13, 1998. (http://web.lexis–nexis.com/requester/document?).

Wald, Matthew L., Spending It; Untying Cellular Phones From Those Annual Contracts; The New York Times; Section 3; p. 10; col. 2; Money and Business/Financial Desk; Mar. 15, 1998, Sunday, Late Edition—Final. (http://web.lexis–nexis.com/requester/document?).

"American Eagle Outfitters, Inc. Introduces the First Clear Credit Card"; PR Newswire; Financial News, Warrendale, Pa., Mar. 26, 1998, Thursday; download date: Mar. 27, 1998. (http://web.lexis–nexis.com/requester/document?).

Teh Hooi Ling, "Prices of handphones dive, thanks to cross–subsidies"; Business Times (Singapore); p. 1; Apr. 8, 1998; download date: Apr. 9, 1998. (http://web.lexis–nexis.com/requester/document?).

"Card Briefs: Beneficial, Casual Male Team up on Card"; The American Banker; Cards; p. 20; May 4, 1998, Monday; download date: May 1, 1998. (http://web.lexis–nexis.com/requester/document?).

"Points Earn Little Credit as Cardholders Fail to Cash In"; Birmingham (England) Post, p. 32; May 9, 1998, Saturday; download date: Nov. 11, 1998. (http://web.lexis–nexis.com/requester/document?).

"Jay Jacobs Inc. Introduces Private Label Credit Card"; Business Wire; Seattle, WA; May 18, 1998, Monday. (URL:http://www.businesswire.com) (http:/web.lexis–nexis.com/requester/document?).

"Wells Park Group Launches "V.I.P. Rewards"; the Most Comprehensive Relationship Marketing Program Ever Created by a Mall Developer"; Business Wire, May 19, 1998, Tuesday; download date: May 20, 1998. (http://web.lexis–nexis.com/requester/document?).

"Shoppers Charge Accounts Co. to Administer Private Label Credit Card For Lew Magram, Ltd.; Program Marks SCA's Entry into Retail Catalog/Mail Order Industry"; PR Newswire; Financial News; Mahwah, N.J.; Jun. 29, 1998, Monday; download date: Jun. 30, 1998. (http://web.lexis–nexis.com/requester/document?).

Quittner, Joshua, "Cell Phones At 7–11? Almost everyone is selling wireless service these days. Here's how to get the right deal."; Time; Personal Time/Your Technology; p. 95; Jul. 6, 1998; download date: Jul. 14, 1998. (http://web.lexis–nexis.com/requester/documet?).

Cruz, Humberto, "The Savings Game. Read fine print in rebate offers by credit cards"; The Cincinnati Enquirer; Financial, p. B16; Aug. 31, 1998, Monday, All Editions; download date: Sep. 3, 1998. (http:/web.lexis–nexis.com/requester/document?).

"Take 5 minutes to open an account now and take 10% off your purchases all day*"; Photocopy of Club Macy's Membership Application; 1998.

Photocopy of Filene's Credit Card Application; 09/98.

Bloom, Jennifer Kingson, "Wal–Mart on Retail Road Less Traveled: Cobranding"; The American Banker; Card Section; Sep. 11, 1998, Friday; download date: Sep. 10, 1998. (http://web.lexis–nexis.com/requester/document?).

Elkin, Toby, "Promotions: MasterCard Wins Coveted On–Pack Real Estate In Tie–in with Microsoft"; Brandweek formerly Adweek Marketing Week; Sep. 14, 1998. (http://web.lexis–nexis.com/requester/document?).

Sinclair, Stewart, "To mail or not to mail?"; Strategy; Strategy Directresponse Special Report; Couponing; p. D21; Oct. 12, 1998; download date: Apr. 21, 1999.

Griffin, Kate, "Issuers Charge Ahead to Focus on Price vs. Brand"; Card Marketing; vol. 2 No. 10; Nov. 1998. (http://cardmarketing.faulknergray.com).

"Retail Cards: Attention Kmart Card Holders: 6% Back Is Dead A New Package of Perks is Coming"; Credit Card News; Nov. 1, 1998; download date: Dec. 17, 1998. (http://web.lexis–nexis.com/requester/document?).

Feldman, Amy, "Paying With Plastic Not Such Smart Idea"; From: News and Views/Media and Business/; Wednesday, Nov. 4, 1998; download date: Mar. 22, 1999.

Cowell, Alan, "America's Turn to Colonize; CreditCard Issuers Invade Britain, With U.S. Firepower"; The New York Times; Section C; p. 1; col. 2; Business/Financial Desk; Nov. 12, 1998, Thursday, Late Edition—Final; Dateline: London, Nov. 11, 1998. (http://web.lexis–nexis.com/requester/document?).

Shermach, Kelly, "Partnerships Help Issuers Weave Web Concepts"; Card Marketing; vol. 2 No. 11; Dec. 1998. (http://cardmarketing.faulknergray.com).

"Amazon.com and NetFlix.com Establish Promotional Relationship for the Sale and Rental of DVD Titles"; Business Wire; Scotts Valley, Calif.; Dec. 4, 1998, Friday; download date: Dec. 5, 1998. (http://web.lexis–nexis.com/requester/document?).

Dennis, Sylvia, "Visa Gets Ready For Interactive Set–Top Boxes"; Newsbytes; Dec. 14, 1998, Monday; download date: Dec. 15, 1998.

Shermach, Kelly, "Retailers Rebuild Roots As Loyalty Pioneers"; Card Marketing; vol. 3 No. 1; Jan. 1999. (http://web.lexis–nexis.com/requester/document?).

"Northwest Airlines, Sprint Enter Into Mileage Partnership; Consumers Can Earn Up to 16,500 Frequent Flyer Miles Through Wide Range of Communications Services—Long Distance, Internet, Paging and Ultimately Sprint PCS"; PR Newswire; Financial News; Jan. 5, 1999, Tuesday. (http://web.lexis–nexis.com/requester/document?).

"E–Card Web Page"; E–Commerce Services from First USA; Jan. 11, 1999. (http://apl.firstusa.com/pcard/index1.cfm?).

"About SaveSmart"; SaveSmart.com; Jan. 12, 1999. (http://www.savesmart.com/about/savesmart.html).

"mySimon"; mySimon.com Fact Sheet; Jan. 13, 1999 10:18 AM. (http://www.simon.com/corporate/company/factsheet.html).

"About ClickRewards the best way to earn miles"; ClickRewards.Com; Jan. 13, 1999. (http://www.clickrewards.com/about.html).

"Join AOL Long Distance and this is what you will receive: . . . "; Wednesday, Jan. 13, 1999.

"FYI; Calls are free, after the ads"; Star Tribune (Minneapolis, MN); p. 1D; Jan. 14, 1999, Metro Edition; download date: Jan. 15, 1999. (http://web.lexis–nexis.com/request....).

"AltaVista's special offer to you . . . $10 for any CD!"; Jan. 17, 1999.

"Amelia Endeavour Travel"; Jan. 17, 1999.

"Sprint Sense Anytime"; Titanic on Videocassette is free when you sign up for Sprint Sense Day long distance; Jan. 18, 1999. (http://csg.sprint.com/titanic/).

O'Brien, Timothy L., "The Markets:Market Place—Taking the Danger Out of Risk; Chase Says Models Helped it Avoid Financial Minefields"; The New York Times; Section C; p. 1; Col. 2; Business/Financial Desk; Jan. 20, 1999, Wednesday, Late Edidtion—Final; Correction Appended. (http://web.lexis–nexis.com/requester/document?).

Cox, Beth, "Visa TravelWeb Enter Online Marketing Partnership"; internetnews.com; Jan. 21, 1999; download date: Jan. 25, 1999. (http://www.internetnews.com/ec–news/1999/01/2103–visa.html).

Ellin, Abby, "Listening To an Earful for Savings" (Hear the Pitches and Talk for Free); The New York Times; Sunday, Jan. 24, 1999.

"Kiosk Issues Cards for Loyalty and Credit: DataCard, Minneapolis, has introduced a line of kiosks that retailers can use to issue loyalty program cards and in–store charge cards"; RTnews; Feb. 1999.

Files, Jennifer, "Grocers, AT&T team up; 'Smart' coupon to offer bonus"; The Dallas Morning News; Business; p. 12F; Feb. 6, 1999, Saturday Third Edition; download date: Feb. 7, 1999. (http://web.lexis–nexis.com/requester/doc....).

Wijnen, Renee, "Listening to Ads Earns Free Long Distance; Advertisers select target groups to hear messages"; DM News; Supplement; Teleservices News; p. 1; Mar. 1, 1999; download date: Mar. 11, 1999. (http://web.lexis–nexis.com/requester/document?).

"Smart Cards; Buying Via Cable Lines"; Future Banker; Future Money; p. 19; Mar. 1, 1999; download date: Mar. 12, 1999.

"Cardtrak Online"; ATM Ads; Mar. 4, 1999. (http://www.cardweb.com/cardtrak/news/1999/march/4aq.html).

"Citi–Visa Rift Alters Smart Card Realm"; Smart Card Quarterly; EFT Report; vol. 22, No. 6; Mar. 24, 1999.

"Wells Fargo ATMs in California become little billboards"; Marketing News TM; p. 4; Mar. 29, 1999; download date: Mar. 30, 1999. (http)://web.lexis–nexis.com/In.universe/s....).

Photocopy of a coupon obtained from a coupon–dispensing machine at a Safeway grocery store on May 19, 1999: "$20 in free groceries when you switch to AT&T Residential Long Distance Service. Call 1 800 288–262 AT&T".

"Planet U; making promotional offers available to U"; May 23, 1999. (http://www.planetu.com/Pages/con–index.html).

"Five great reasons to enroll"; May 23, 1999. (http://www.coolsavings.com/scripts/why enroll.asp?...).

"E–Centives"; May 23, 1999. (http://www.emaginet.com/de...memfaq.shtml).

Visa—Smart Cards—About Smart Cards; "What is a Smart Card?" (http://www.visa.com/nt/chip/info.html); May 23, 1999.

"Smart Cards for Windows"; The Smart Card Market Opportunity; May 23, 1999. (http://www.microsoft.com/windowsce/smartcard/start/background.asp).

"Our Cards: Smart Cards"; "Using Smart Cards to Deliver New Value": MasterCard—The SmartCard: News & View; MAy 23, 1999. (http://www.mastercard.com/ourcards/smartcard/articles/article4.html).

"Deja.com"; May 24, 1999. (http://x24.deja.../getdoc.xp?...).

"Royal Bank is First to Offer Instant Discount Program on No–Frills, Low Rate Option and Classic Visa Cards"; Canada New Wire; Financial News: Jul. 2, 1999, Friday. (http://web.lexis–nexis.com/In.universe/search/doocument-Display?).

Higginbotham, Stacey, "Next, Online Bids Over Jail Time?", Business Week; Up Front Section; Jul. 19, 1999.

Armstrong, Larry, "The Free–PC Game: Lure 'Em in and Lock 'Em Up"; Business Week; Information Technology; Jul. 19, 1999.

Poletti, Therese, "Latest Twist on Free PC's—Free iMacs"; Yahoo! News, Technology Headlines; Tuesday, Aug. 3, 1:03 AM ET; download date: Aug. 9, 1999. (http://dailynews.yahoo.com/headlines/tc/story.html?).

Hamilton, Doug, "Florida museum displays massive JFK collection; Going Places: News, Notes & Tips"; The Atlanta Journal and Constitution; Sunday, Home Edition; Travel; p. 4K.; Nov. 7, 1999. (http://web.lexis–nexis.com/In.universe/search/documentDisplay?).

Brochure: "Here's Your Cashback Bonus Award", Greenwood Trust Company (1997).

Henry Goldblatt, "AT&T Finally Has an Operator", Time Magazine, Feb. 16, 1998 at p. 79.

Robert McNatt & Larry Light, "Reach Out and Pay Someone", Business Week, Mar. 23, 1998 at p. 4.

Int. Search Report, Feb. 9, 1999, PCT.

Herb Linnen and Jim McGann, "AT&T comments on new FCC rules to curb "slamming"", AT&T News Release, Jun. 14, 1995.

Jim Kerstetter, "E–commerce updates get intelligent agents" Information Access Company, a Thompson Corporation Company; ASAP; Ziff–Davis Publishing Company, No. 5, vol. 14; p. 6; ISSN:0740–1640.

"Switch your Chase MasterCard to a Shell MasterCard from Chase and you'll earn: Free FormulaShell Gasoline", Chase, Copyright Sep. 1997.

Chuck Ross and Louise Kramer, "Coke card promotion set for '98, Summer effort to enlist array of retailers for merchandise discounts", Advertising Age, Crain Communications,Inc. Copyright Nov. 1997. http://adage.com/news_ and _features/features/19971117/article3.html.

"MCI PrePaid Cards, Business Opportunities", download date Apr. 21, 1998. http://www.mci.com/aboutus/products/prepaid/promotional.shtml.

"MCI Freeflix Free Video Rental Program", download Apr. 21, 1998, Copyright 1998, MCI Telecommunications Corporation http://www.mci.com/aboutus/products/glossary/home/freeflix/shtml.

"Active Trader Rebate Program" Wall Street Access . . . : Active Trader Rebate Program—Signal, BMI, QuoTrek and StockEdg, Download date Apr. 22, 1998. http://www.wsaccess.com/active_rebate_program.htm.

"Microsoft and First USA Announce $90 Million Advertising Alliance for MSN; First USA to Become Exclusive Credit Card Advertiser Across Most of MSN In the Largest Internet Advertising Deal", PR Newswire Association, Inc., PR Newswire Financial News Section, Oct. 28, 1998, htpp://web.lexis–nexis.com/In.universe/s..a3&_md5=db04f5c13d2e2621fa22c982fc951098.

"Competition: First USA, With Its Microsoft Pact, Is King of the Internet", Credit Card News, Faulkner & Gray, a division of Thomson Information Services, Inc. a New York Corporation, Nov. 1, 1998, http://web.lexis–nexis.com/In.universe/s...a3&_md5=91ab391b708c83549f6de5100a541a35.

"#1 Online Department Store Joins Click Rewards in Time for the Holidays: Azazz.com to Supply Name–brand Merchandise for Netcentives' ClickRewards Catalog and Click-Rewards; Members Can Now Earn Generous ClickMiles Promotions Within the Azazz.com Internet Department Store", PR Newswire Association, Inc., PR Newswire, Nov. 27, 1998, http://web.lexis–nexis.com/In.universe/s..a3&_md5=9feeb8c53a31851ab13321cd728fc293.

"Largest Internet ad deal signed", Lafferty Publications Limited, Bank Marketing International, p. 7, Dec. 2, 1998, http://web.lexis–nexis.com/In.universe/s..a3&_md5=7f8b731f027f505123d7e6b48e5d7eed.

At Sports Superstore Online, Shoppers get More For Their Money; 10,000 Reasons to Shop at Sports Superstore Online, Business Wire, Inc., Dec. 4, 1998, http://web.lexis–nexis.com/In.universe/s...a3&_md5=d52757b144e8190c25cb9d35bcdb1692.

Miriam Kreinin Souccar, "Epidemic of Rate Shopping Spurs a Search for Remedies", The American Banker Inc., Jan. 7, 1999 http://web.lexis–nexis.com/In.universe/s...a3&_md5=2d3eab8386c438f589062c3d5a7847aa.

IAFC Launches NextCard (sm)—The First True Internet VISA, NextCard breaks new ground in electronic commerce by delivering instant, online VISA credit card approvals), downloaded Sep. 14, 1999. http://www.nextcard.com/release1.html.

* cited by examiner

BILLING STATEMENT ISSUER
CUSTOMER DATABASE 300

| CUSTOMER NAME 330 | BILLING ADDRESS 335 | ACCOUNT IDENTIFIER 340 | OUTSTANDING BALANCE 345 | MINIMUM AMOUNT DUE 350 | DUE DATE 355 |
|---|---|---|---|---|---|
| BOB SMITH | 123 MAIN ST. TOWN, STATE 09111 | 1234-1234 | $1,600.00 | $160.00 | 4/15/98 |
| THOMAS JONES | 436 PLAIN ST. CITY, STATE 23555 | 1234-5678 | $250.00 | $25.00 | 4/15/98 |
| SUE JOHNSON | 987 1ST AVE. CITY, STATE 09829 | 1234-9876 | $150.00 | $15.00 | 4/15/98 |
| MARY MARTIN | 876 VINE ST. TOWN, STATE 98765 | 1234-4565 | $350.00 | $35.00 | 4/15/98 |
| JOHN DOE | 345 BROADWAY CITY, STATE 23666 | 1234-2364 | $80.00 | $8.00 | 4/15/98 |

OFFEROR SERVICE PROVIDER
RULES DATABASE 400

| OFFER TYPE IDENTIFIER 430 | OFFEROR SERVICE PROVIDER IDENTIFIER 435 | OFFER RULES 440 | MAXIMUM OFFER AMOUNT 445 |
|---|---|---|---|
| 1 | AT&T | OFFER TO PAY UP TO MAXIMUM OFFER AMOUNT OF CUSTOMER'S MINIMUM AMOUNT DUE<br>ONLY OFFER TO CUSTOMERS WITH ZIP CODES BEGINNING WITH 09 | $75.00 |
| 2 | CITIBANK VISA | OFFER TO PAY MAXIMUM OFFER AMOUNT TO CUSTOMER'S ACCOUNT<br>ONLY OFFER TO CUSTOMERS WITH A CREDIT RATING >B | $80.00 |
| 3 | AMERICA ONLINE | IF MAXIMUM OFFER AMOUNT ≥ MINIMUM PAYMENT DUE, OFFER TO PAY CUSTOMER'S MINIMUM PAYMENT DUE<br>ONLY OFFER TO CUSTOMERS WITH ZIP CODES BEGINNING WITH 23 | $25.00 |

405 — row 1
410 — row 2
415 — row 3

FIG. 4

OFFER STATUS DATABASE 500

| ACQUISITION OFFER IDENTIFIER 530 | OFFEROR SERVICE PROVIDER IDENTIFIER 535 | CUSTOMER ACCOUNT IDENTIFIER 540 | STATUS 545 | OFFER AMOUNT 550 | OFFER MAILING DATE 555 | OFFER EXPIRATION DATE 560 |
|---|---|---|---|---|---|---|
| 77777 | AT&T | 1234-1234 | OPEN | $75.00 | 3/15/98 | 4/15/98 |
| 75643 | AT&T | 1234-9876 | ACCEPTED | $15.00 | 3/15/98 | 4/15/98 |
| 78257 | AOL | 1234-5678 | ACCEPTED | $25.00 | 3/15/98 | 4/1/98 |
| 72255 | AOL | 1234-2364 | EXPIRED | $8.00 | 3/15/98 | 4/1/98 |

| OFFEROR SERVICE PROVIDER IDENTIFIER 630 | CUSTOMER NAME 635 | BILLING ADDRESS 640 | ACCOUNT IDENTIFIER 645 |
|---|---|---|---|
| AT&T | MARY MARTIN | 876 VINE ST. TOWN, STATE 98765 | 22-66-988 |
| AOL | SAM ROBERTS | 456 MULBERRY ST. TOWN, STATE 04196 | 675-7800 |
| AT&T | SUE JOHNSON | 987 1ST AVE. CITY, STATE 09829 | 22-66-987 |
| AOL | THOMAS JONES | 436 PLAIN ST. CITY, STATE 23555 | 675-7799 |

OFFEROR SERVICE PROVIDER CUSTOMER DATABASE 600

605
610
615
620

BILLING STATEMENT

Thomas Jones
436 Plain St.
City, State 23555

| CUSTOMER ACCOUNT IDENTIFIER | PAYMENT DUE DATE | MINIMUM PAYMENT DUE |
|---|---|---|
| 1234-5678 | 4/15/98 | $25.00 |

| SERVICE DESCRIPTION | AMOUNT DUE |
|---|---|
| SERVICE A | $100.00 |
| SERVICE B | $50.00 |
| SERVICE C | $100.00 |
| TOTAL OUTSTANDING BALANCE | $250.00 |

Can't make ends meet? Simply agree to become a member of America Online by checking the box below, and America Online will pay your minimum payment this month!

☐ YES! I authorize America Online to pay my minimum payment due this month. By doing so, I agree to use AOL as my primary Internet Service Provider.

PAYMENT PROCESSING CENTER
678 NICE PL.
FUNTOWN, USA 06660

CUSTOMER ACCOUNT IDENTIFIER 1234-5678

FIG. 8

BILLING STATEMENT CUSTOMER ACQUISTION SYSTEM

CROSS-REFERENCE TO RELATED APPLICATIONS

This application is a continuation-in-part of U.S. patent application Ser. No. 08/982,149, filed Dec. 1, 1997, now U.S. Pat. No. 6,196,458, incorporated by reference herein.

FIELD OF THE INVENTION

The present invention relates generally to customer acquisition systems and more particularly, to a method and apparatus for facilitating acquisition of new customers using billing statements.

BACKGROUND OF THE INVENTION

The service economy has grown substantially in recent years. In the long distance telephone market, for example, over two hundred million (200 million) long distance calls are placed, on average, each day in the United States alone. For many such service-based businesses, fixed costs are high and variable costs are low, resulting in high profit margins for incremental customers (each additional customer after a threshold number of customers that are required to pay for fixed cost). Thus, it is clear why long distance carriers and other service providers are so aggressive in their pursuit of new accounts.

In the long distance telephone market, for example, the incremental profits achieved from completing each additional call in excess of a threshold number of calls has been estimated to be as high as ninety eight percent (98%). Accordingly, service providers are constantly searching for new techniques and promotions to acquire new accounts. For example, as an added incentive to open or maintain an account, many long distance carriers offer reward programs, such as the True Rewards™ program offered by AT&T, that provide subscribers with discounts and free gifts. In addition, many long distance carriers offer additional incentives to encourage a potential new customer to switch long distance carriers. For example, many long distance companies will mail a check to a potential customer to encourage that customer to switch his or her long distance carrier. If a potential customer cashes the check, the endorsement on the check also serves as an authorization to change the customer's long distance provider.

Many service providers attempt to lure new customers with various direct marketing promotions. Service providers, such as long distance carriers and credit card issuers, initially identify potential customers and then typically send many different mail solicitations to each targeted customer. During 1996 alone, credit card companies mailed out more than two billion unsolicited offers for new credit cards to U.S. households, in addition to placing tens of millions of telemarketing phone calls, in an attempt to acquire cardholders.

While a number of service providers have been successful in obtaining valuable new customers with such direct marketing approaches, it has been found that the vast majority of customers ignore such promotions in view of the overwhelming number of promotions received and the failure of service providers to differentiate their service products and various direct marketing promotions. In fact, a direct-mail campaign is often deemed a success in the industry if the campaign achieves a "response rate" of just three percent (3%). In other words, a direct-mail marketing campaign may be a success even when ninety-seven percent (97%) of mail pieces are inefficiently and wastefully discarded by recipients. Thus, in order to reach valuable new customers, service providers constantly search for more efficient and effective ways to acquire new customers.

The problems and costs associated with current methods for acquiring new customers, however, are not limited to service providers. Even from the customer's point of view, conventional service provider acquisition techniques are unsatisfactory. Many customers are confused, discouraged and annoyed by the repeated attempts of service providers to solicit the customer's business through direct marketing efforts. Specifically, customers would benefit if they received an incentive to switch to a new service provider at a time when the customer was more likely to switch. In fact, if the incentives associated with acquiring new customers were properly offered, customers would be more likely to accept such offers.

The billing statements of various businesses have been used as a mechanism to advertise to account holders. Many merchants pay one or more billing statement issuers for the ability to promote goods and services in promotional materials that are sent with billing statements. For example, NewSub Services, Inc., of Stamford, Conn., is a merchant that has advertised magazine subscriptions through attachments to billing statements. In this manner, an account holder's billing statement can serve as a medium for advertising to that account holder. Since the customer must theoretically open the billing statement to pay the amount due, the likelihood that the customer will see the advertising message is greatly increased compared to traditional direct mail promotions. In addition, the parent application to the present application discloses an automated system that uses predetermined criteria to print an offer for one or more products to an account holder on a billing statement, and to allow the account holder to purchase those offered products using the billing statement.

Billing-dependent businesses are also concerned with the inability to collect full payment owed by account holders. Such uncollected payments, also called "uncollectable debt", are considered a cost of doing business and consequently decrease the profits of the billing-dependent businesses. Therefore, a reduction in uncollectable debt would be advantageous.

As apparent from the above deficiencies with conventional customer acquisition methods, a need exists for a method and system that allows a service provider to more efficiently and effectively acquire new customers. Yet another need exists for a system that allows a billing-dependent business to minimize their amount of uncollectable debt.

SUMMARY OF THE INVENTION

Generally, according to one aspect of the invention, a customer acquisition system is disclosed that allows an "offeror service provider" to acquire new customers by making "acquisition offers" to customers through the billing statements of other businesses, referred to herein as "billing statement issuers." The customer acquisition system uses predetermined criteria to automatically include an acquisition offer on a billing statement or on associated promotional materials, and allows the customer to accept the acquisition offer using the billing statement. Since each billing statement is likely to be read by the customer, the billing statement may be employed to make acquisition offers to existing customers of the billing statement issuer. The customer acquisition system optionally ensures that the customer is not an existing customer of the offeror service provider before extending an acquisition offer.

The amount owed by the customer may determine whether the customer receives an acquisition offer. For example, based on stored rules or other predefined criteria, the acquisition offers can be targeted to customers whose minimum monthly payment is less than, equal to, or even greater than the per-acquisition budget of the offeror service provider. In a further variation, acquisition offers can be targeted to customers based on geographic information, such as zip codes, or historical data, such as credit reports or purchase histories. In this manner, the customer acquisition system allows service providers to target localized markets by using the customer databases of other geographically-oriented service providers, such as utility companies. Thus, the present invention allows an offeror service provider to make an acquisition offer to a billing statement issuer's existing customers, such that the offeror service provider will agree to credit the customer's account with the billing statement issuer, provided that the billing statement issuer's customer becomes a customer of the offeror service provider.

In one embodiment, the customer may accept the acquisition offer, for example, by circling or marking a corresponding "check box" on the billing statement and returning the statement with the payment, if any, to the billing statement issuer. Upon receiving an indication that an acquisition offer was accepted, the offeror service provider is notified to transfer the appropriate funds to the billing statement issuer.

A more complete understanding of the present invention, as well as further features and advantages of the present invention, will be obtained by reference to the following detailed description and drawings.

BRIEF DESCRIPTION OF THE DRAWINGS

FIG. 3 is a table illustrating the billing statement issuer customer database of FIG. 2;

FIG. 4 is a table illustrating the offeror service provider rules database of FIG. 2;

FIG. 5 is a table illustrating the offer status database of FIG. 2;

FIG. 8 is an illustrative billing statement produced by the customer acquisition system of FIGS. 1 and 2.

DETAILED DESCRIPTION

In accordance with the present invention, billing statements are used by an offeror service provider to provide acquisition offers to customers. Many businesses provide their customers with billing statements that include crucial information such as each charge within a period of time, a total amount due and a minimum payment amount. Thus, acquisition offers are very likely to be seen by customers.

Acquisition offers are also more likely to be considered and accepted by customers since customers can easily indicate acceptance on their billing statements. Furthermore, an accepted offer provides a significant benefit: reduction or elimination of a debt shown on the billing statement. Thus, the present invention can result in a significant response rate to a customer acquisition campaign.

Acquisition offers are especially advantageous for people with limited funds. Such people frequently cannot repay all of their bills in a given month or even make the minimum required payments. Consequently, they prioritize their bills based on the value of the corresponding services. For example, if a customer with limited funds feels telephone service is more important than cable television service, he will probably pay the telephone bill rather than the cable bill. However, if the customer is provided an acquisition offer in accordance with the present invention, he is likely to accept since the benefit (reduction or elimination of a debt) typically outweighs the cost (accepting a service, such as switching to a new service provider).

Figure 1:
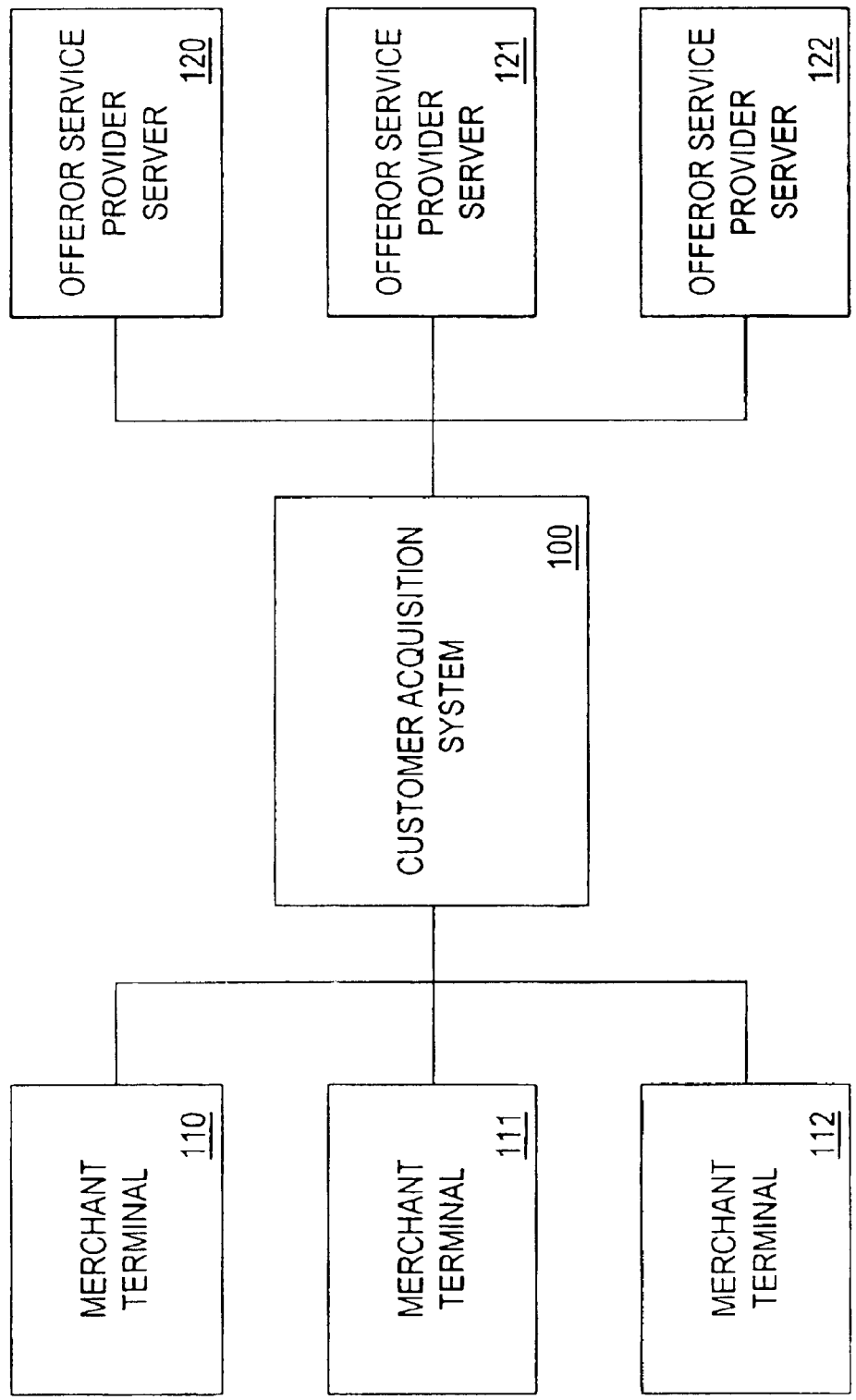
FIG. 1 is a schematic block diagram illustrating a suitable communications network environment for interconnecting a customer acquisition system with one or more merchant terminals and one or more servers associated with offeror service providers.

FIG. 1 illustrates a customer acquisition system 100 associated with a billing statement issuer. The billing statement issuer is typically an entity that has an established relationship with a customer, and that generates one or more billing statements detailing an amount owed by the customer to the billing statement issuer or to a third party. The billing statement issuer may be, for example, a credit card issuer, a department store, a public utility, a cable television provider, a health maintenance organization (HMO), a long distance carrier or an Internet Service Provider (ISP). According to a feature of the present invention, the customer acquisition system 100 is an automated system that uses predetermined criteria to include an acquisition offer on a billing statement or on associated promotional materials, and allows the customer to accept the acquisition offer using the billing statement.

Billing statements typically detail each charge over a period of time, a total amount due, which is calculated by totaling the individual transaction amounts, and a minimum payment amount. For example, credit card issuers provide each of their account holders with a billing statement that lists each transaction, such as purchases and payments, which have been applied against their credit card account. Each transaction listed on the statement (each "billing item") specifies a transaction amount, such as a purchase price debited to the account or a payment credited to the account. Billing items may further comprise merchant-specified text identifying the transaction, such as the merchant's name, address and telephone number. In addition, a billing statement indicates the total amount due, which is calculated by totaling the individual transaction amounts, and a minimum payment amount.

The acquisition offers are made by the billing statement issuer to the customers on behalf of one or more offeror service providers. The offeror service provider is an entity that wishes to acquire new customers. Typically, the offeror service provider is registered with the billing statement issuer to make acquisition offers to the customers of the billing statement issuer. As used herein, an "acquisition offer" is an offer by the offeror service provider to pay an amount owed by the customer to the billing statement issuer as detailed in the billing statement, or a portion thereof, provided the customer agrees to become a customer of the offeror service provider. In one embodiment, the acquisition offer may require the customer to become a customer of the offeror service provider for a predefined minimum period of time or to use a certain minimum dollar amount of the service. The acquisition offers could be funded, for example, by the acquisition budgets of the offeror service providers. In this manner, the billing statement may be employed to make acquisition offers to existing customers of the billing statement issuer, because billing statements are almost certain to be read by the customers.

According to a further feature of the invention, discussed below, the customer acquisition system 100 optionally ensures that the customer is not an existing customer of the offeror service provider before extending an acquisition offer. Thus, as shown in FIG. 1, the customer acquisition system 100 is in communication with servers 120, 121 and 122, each associated with an offeror service provider that is registered with the billing statement issuer to make acquisition offers. Although three servers are illustrated in FIG. 1, those skilled in the art will understand that any number of servers may be in communication with system 100. The customer acquisition system 100 can determine if a customer is already a customer of the offeror service provider. The customer acquisition system 100 communicates with the servers 120, 121 and 122 through any of a number of known communication mediums, such as through the Public Switched Telephone Network ("PSTN"), an Internet connection or a wireless communication medium. The customer acquisition system 100 can (i) communicate in real-time with one or more of the server(s) 120, 121 and 122 before making an acquisition offer to determine if a customer is already an existing customer of the associated offeror service provider(s) (ii) receive periodic updates of the customer lists of each offeror service provider from the servers 120, 121 and 122; or (iii) a combination of the foregoing.

In addition, the amount owed by a particular customer may determine whether the customer receives an acquisition offer. For example, based on stored rules or other predefined criteria, the acquisition offers could be targeted to customers whose minimum monthly payment is less than, equal to, or even greater than the per-acquisition budget of the offeror service provider. In a further variation, acquisition offers can be targeted based on demographic information, such as zip codes, or historical data, such as credit reports or purchase histories. It is noted that the billing statement issuer and the offeror service provider need not be separate entities. For example, a company that provides long distance service to a customer may include an acquisition offer in the customer's long distance billing statement to also serve as the customer's Internet Service Provider. Thus, it is also noted that in such an embodiment, some or all of the functions of servers 120, 121 and 122 may be performed by the customer acquisition system 100.

As shown in FIG. 1, the customer acquisition system 100 is also in communication with one or more merchant terminals 110, 111 and 1112, through any of a number of known communication mediums, such as through the Public Switched Telephone Network ("PSTN"), an Internet connection or a wireless communication medium. In a retail embodiment, each of the merchant terminals 110, 111 and 112 is a data entry device accepting data generated by or on behalf of a merchant, such as a retail store. For example, the merchant terminals 110, 111 and 112 may be point-of-sale computers, telephones interfacing with a voice response unit (VRU) or card authorization terminals. For a more detailed discussion of conventional retail transaction processing, see, for example, the parent application to the present invention, incorporated by reference herein. If the billing statement issuer is a service provider, such as a public utility or a long distance carrier, and does not process retail transactions, one or more merchant terminals may be embodied as a meter that measures the customer's usage of the service provided by the billing statement issuer.

Figure 2:
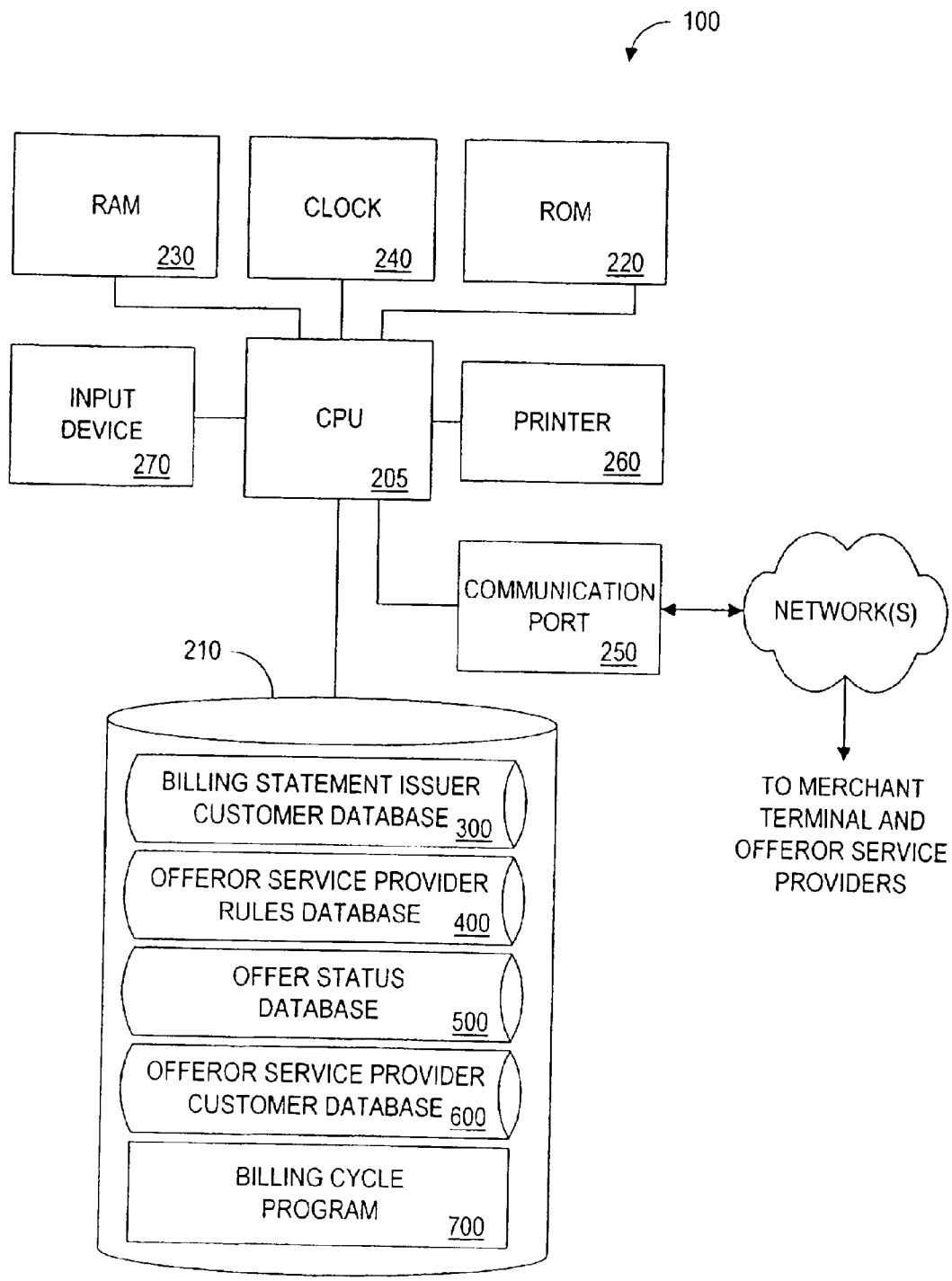
FIG. 2 is a schematic block diagram of the customer acquisition system of FIG. 1.

Referring to FIG. 2, the customer acquisition system 100 includes a central processing unit (CPU) 205 in communication with a data storage device 210, a read only memory (ROM) 220, a random access memory (RAM) 230, a clock 240, a communications port 250, a printer 260 and an input device 270. The CPU 205 can be in communication with the data storage device 210, the read only memory (ROM) 220, the random access memory (RAM) 230, the clock 240, the communications port 250 and the printer 260, by means of a shared data bus or as shown in FIG. 2, dedicated connections. The input device 270 may be embodied, for example, as a keyboard, mouse, joystick or scanner. The communications port 250 connects the customer acquisition system 100 to the merchant terminals 110, 111 and 112 and the servers 120, 121 and 122 of the offeror service providers. The communication port 250 may include multiple communication channels for simultaneous communication with more than one terminal and/or server. The communication port 250 can send and receive offer and account information from customers, offeror service providers and even credit reporting agencies, such as TRW and Equifax. Thus, customers can receive, review and pay their bills, and any associated acquisition offers, entirely online, for example, via electronic mail, without a printed copy of the billing statement.

In one online embodiment, acquisition offers are included in electronic billing statements sent to customers via electronic mail. A customer can thereafter accept an acquisition offer, for example, by sending a reply electronic mail message to the billing statement issuer. In an alternate online embodiment, billing statements can be posted on a web site or electronic bulletin board, where a customer can review his or her billing statement and accept acquisition offers. Thus, as used herein, the phrase "printed on a billing statement" includes acquisition offers printed directly on billing statements or on promotional materials associated with the billing statement or acquisition offers included in billing statements distributed in an electronic format, for example, by means of electronic mail, or posting on a web site or bulletin board.

The CPU 205 may be embodied as one or more processors. The central processing unit (CPU) 205, data storage device 210, and the printer 260 may each be (i) located entirely within a single computer or other computing device; (ii) connected to each other by a remote communication medium, such as a serial port cable, telephone line or radio frequency transceiver; or (iii) a combination thereof. For example, the customer acquisition system 100 may comprise one or more computers which are connected to a remote server computer for maintaining databases or printing large numbers of billing statements.

As discussed further below in conjunction with FIGS. 3 through 6, respectively, the data storage device 210 includes a billing statement issuer customer database 300, an offeror service provider rules database 400, an offer status database 500, and an offeror service provider customer database 600. Generally, the billing statement issuer customer database 300 stores information on each customer of the billing statement issuer, including an identifier of each customer and summary information of the transactions applied against each customer account. The offeror service provider rules database 400 preferably maintains the offer rules for the one or more offeror service providers. Each offer rule defines acquisition offers to extend to customers of the billing statement issuer. The offer status database 500 preferably records each acquisition offer that is made by the customer acquisition system 100 on behalf of offeror service providers. The offeror service provider customer database 600 maintains a list of the customers of each offeror service provider to ensure that an existing customer of the offeror service provider is not extended an acquisition offer. As discussed above, information contained in offeror service provider customer database 600 may alternatively reside at servers 120, 121 and 122 (FIG. 1).

The data storage device 210 and/or ROM 220 are operable to store one or more programs which the CPU 205 is operable to retrieve, interpret and execute. As shown in FIG. 2 and discussed further below in conjunction with FIGS. 7A and 7B, the data storage device 210 includes a billing cycle program 700. The billing cycle program 700 directs the CPU 205 to operate in accordance with the present invention, and particularly in accordance with the methods described in detail herein. Generally, the billing cycle program 700 directs the CPU 205 to generate billing statements that include acquisition offers for customers of the billing statement issuer that are not existing customers of an associated offeror service provider. The billing cycle program 700 also includes program elements that may be necessary, such as "device drivers" for allowing the processor to interface, for example, with the printer 260 and other computer peripheral devices (not shown). Appropriate device drivers and other necessary program elements are known to those skilled in the art, and need not be described in detail herein.

Databases

As will be understood by those skilled in the art, the schematic illustrations and accompanying descriptions of the databases 300, 400, 500, 600 presented herein are exemplary arrangements for stored representations of information to illustrate the principles of the invention. A number of other arrangements and informational content may be employed, as would be apparent to a person of ordinary skill in the art.

As shown in FIG. 3, the billing statement issuer customer database 300 typically includes a plurality of records, such as records 305, 310, 315, 320 and 325, each associated with a different customer. For each customer identified by name in field 330, the billing statement issuer customer database 300 includes the customer's billing address in field 335 and an account identifier in field 340. In addition, the billing statement issuer customer database 300 includes the current outstanding balance, minimum amount due and due date for each customer in fields 345, 350 and 355, respectively. As discussed further below, the information stored in the billing statement issuer customer database 300 is used to determine, for each customer, whether an acquisition offer should be extended to the customer on behalf of one or more of the offeror service providers.

Referring to FIG. 4, the offeror service provider rules database 400 maintains a plurality of records, such as records 405, 410 and 415, each associated with a different acquisition offer. For each acquisition offer type, the offeror service provider rules database 400 includes an offer type identifier in field 430 and an indication of the corresponding offeror service provider in field 435. In addition, the offeror service provider rules database 400 indicates the criteria (rules or requirements) associated with the acquisition offer, and the corresponding maximum offer amount in fields 440 and 445, respectively. As discussed further below, the information stored in the offeror service provider rules database 400 is used to determine whether a potential customer meets the offeror-defined criteria necessary to output an acquisition offer to that customer. As shown in the offeror service provider rules database 400, the maximum offer amount made available by the offeror service providers can be less than, equal to, or even greater than the customer's amount due, at the discretion of the offeror service provider. An offer rule may also specify that the maximum offer amount is always provided. IT will be appreciated that a multitude of other offers and rules may be formulated depending on the business goals of the offeror service provider.

Referring to FIG. 5, the offer status database 500 maintains a plurality of records, such as records 505, 510, 515 and 520, each associated with a different acquisition offer that has been extended to customers of the billing statement issuer. For each acquisition offer, the offer status database 500 indicates (i) an acquisition offer identifier (number) in field 530; (ii) the offeror service provider identifier in field 535; (iii) the associated customer account identifier in field 540; (iv) the status in field 545; (v) the amount of the acquisition offer in field 550; (vi) the mailing date in field 555; and (vii) the expiration date of the acquisition offer in field 560. In one embodiment, an offer expiration date may be set earlier than the bill due date, in an effort to prompt earlier payment from customers accepting the acquisition offers.

Figure 6:
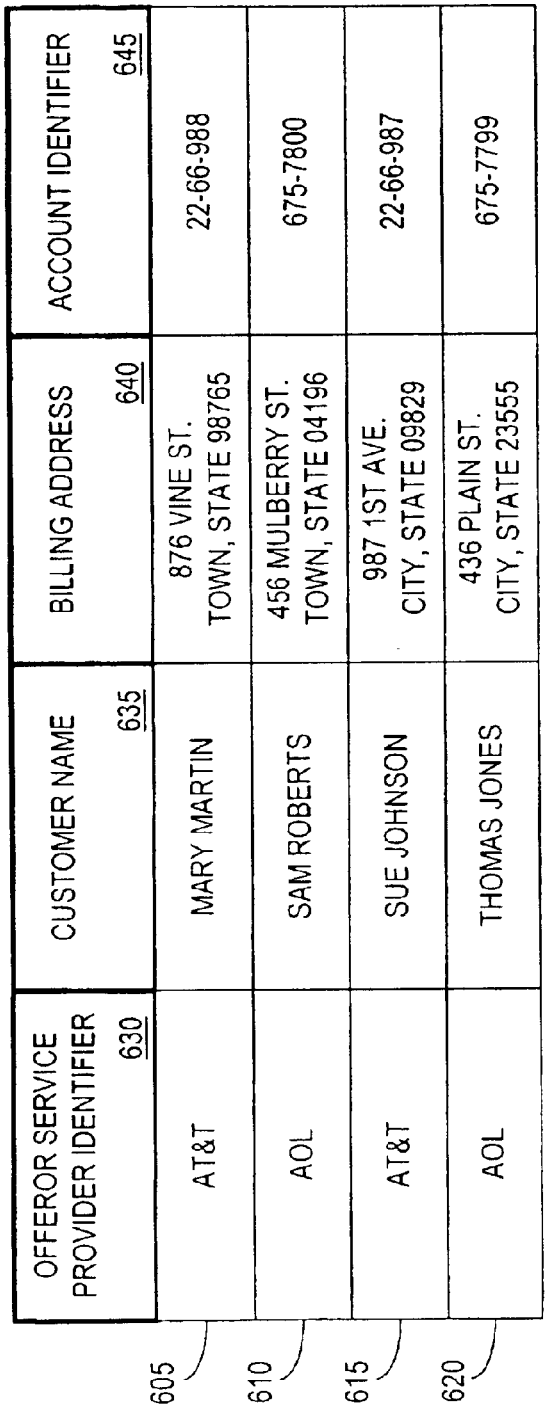
FIG. 6 is a table illustrating the offeror service provider customer database of FIG. 2.

The offeror service provider customer database 600, shown in FIG. 6, contains time-sensitive data. The exemplary data illustrated in FIG. 6 corresponds to a date and time after the offers set forth in records 505, 510, 515 and 520 (FIG. 5) have been accepted and subsequently processed by the customer acquisition system 100. As shown in FIG. 6, the offeror service provider customer database 600 maintains a plurality of records, such as records 605, 610, 615 and 620, each associated with a different customer of each offeror service provider that is registered to make acquisition offers. For each offeror service provider, the offeror service provider customer database 600 indicates a unique offeror service provider identifier in field 630; the corresponding customer name in field 635; and the customer's billing address and account identifier in fields 640 and 645, respectively. Thus, the information stored in the offeror service provider customer database 600 can be used, among other things, to identify existing customers of an offeror service provider and ensure that those existing customers do not receive acquisition offers. Of course, if the customer acquisition system 100 makes inquiries in real-time to the offeror service providers at the time the billing statements are generated, the offeror service provider customer database 600, or at least portions thereof, may not be required or may reside at offeror service provider servers 120, 121 and 122 (FIG. 1). The exemplary customer records 615 and 620 shown in FIG. 6 correspond to new customers of the respective offeror service providers after acquisition offers 510 and 515 (FIG. 5) have been accepted by the respective customers.

Processes

Figure 7A:
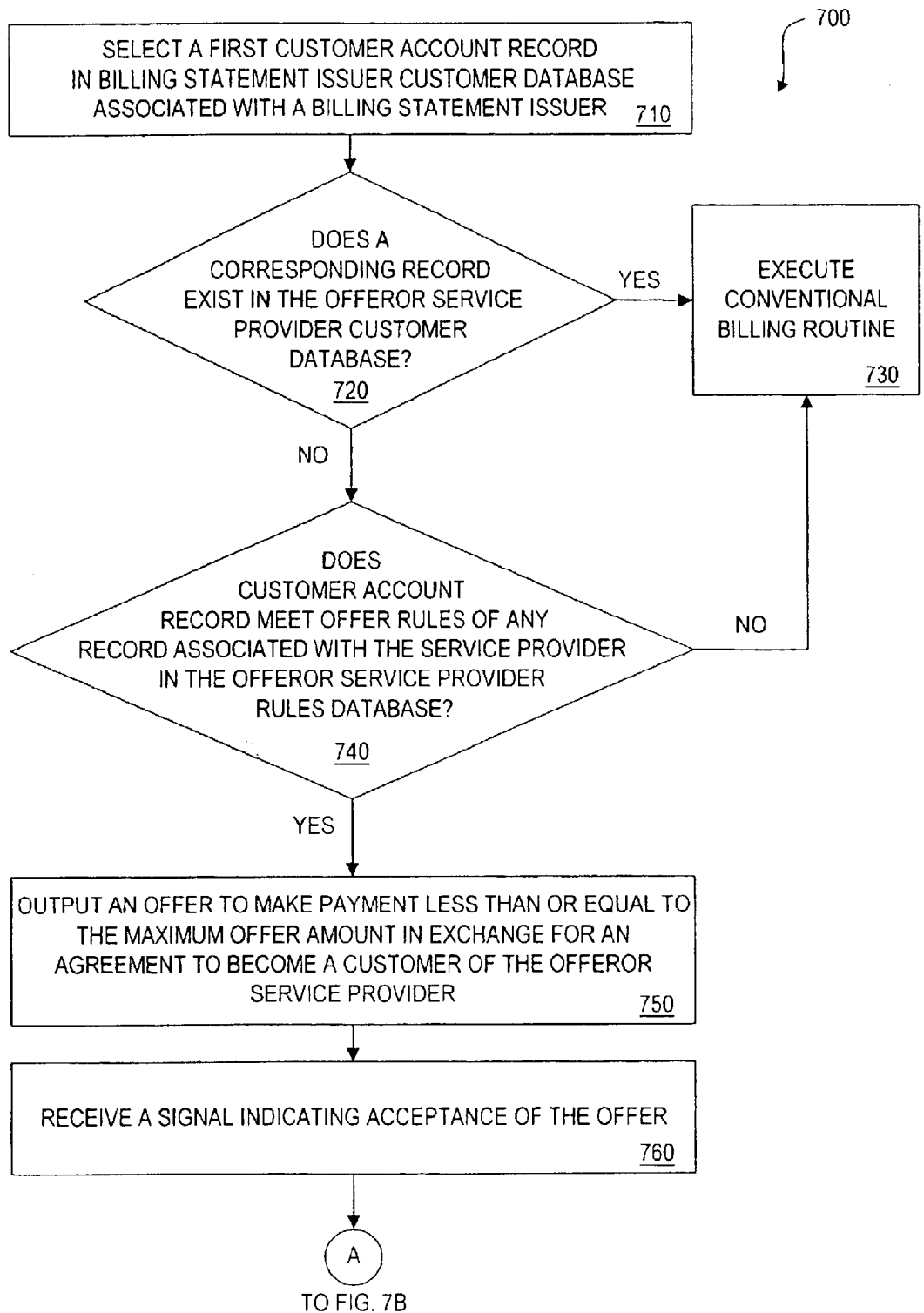
FIGS. 7A and 7B, collectively, are a flow chart describing an exemplary billing cycle process implemented by the customer acquisition system of FIG. 2.
Figure 7B:
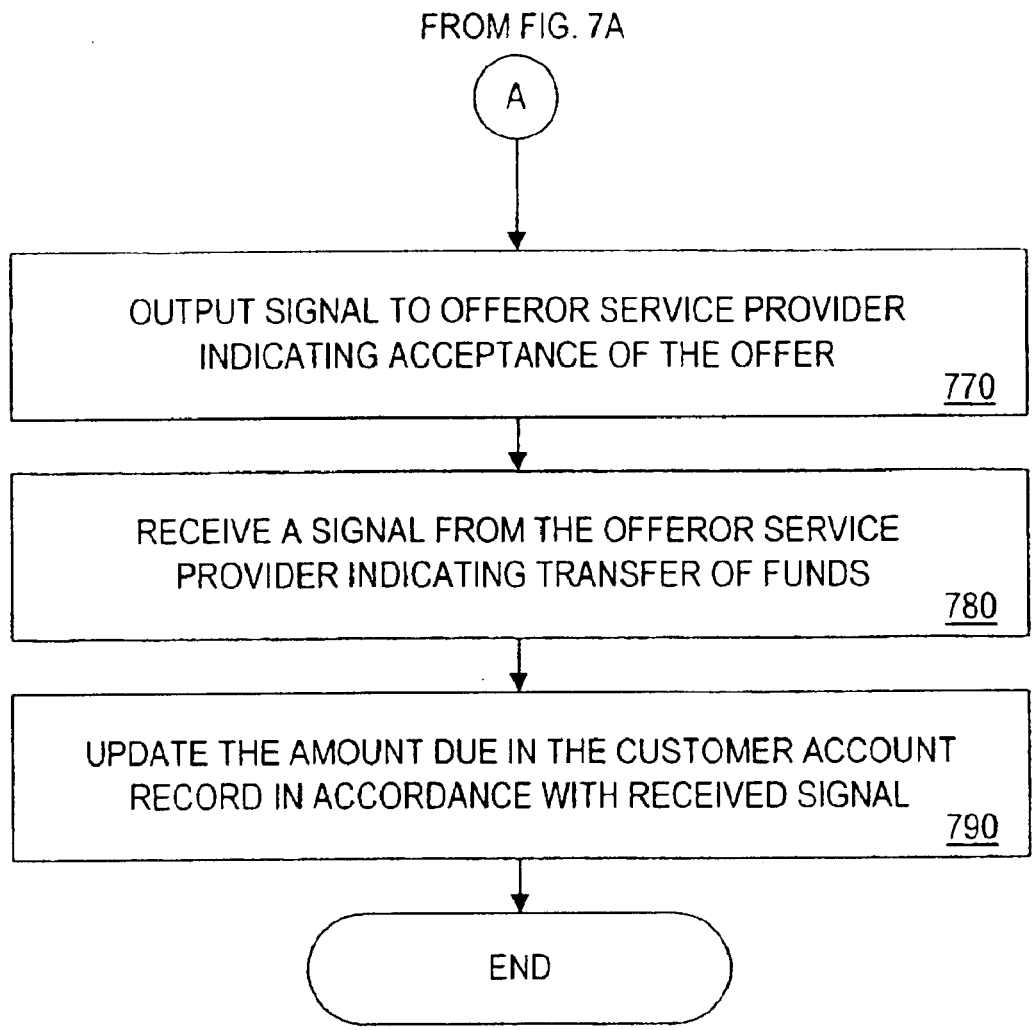

As discussed above, the customer acquisition system 100 may execute a billing cycle program 700, described by the flowchart in FIGS. 7A and 7B, to generate billing statements that optionally include acquisition offers for customers. In one embodiment, the program 700 further assures that the customers receiving acquisition offers are not existing customers of the associated offeror service provider. As shown in FIG. 7A, the billing cycle program 700 can be executed intermittently or at predefined periods to generate billing statements, as required. The description below makes reference to a single customer and a single offeror service provider. Those skilled in the art will understand that the process may also be performed for a plurality of customers and/or a plurality of offeror service providers. The billing cycle program 700 initially selects a first customer account record in the billing statement issuer customer database 300 during step 710. The step 710 of identifying a customer account record may comprise a random selection of a record or selecting the next record in a sequence, as when a predefined group of records are processed.

Thereafter, a test is performed during step 720 to determine if a corresponding record exists in the offeror service provider customer database 600. The test performed during step 720 determines if the customer to be billed is already an existing customer of the offeror service provider. The identifying information for determining if a corresponding record exists may be, for example, a customer name, billing address or other customer identifier. If it is determined during step 720 that a corresponding record exists in the offeror service provider customer database 600, then the customer to be billed is already an existing customer of the offeror service provider, and conventional billing processes are performed during step 730. If, however, it is determined during step 720 that a corresponding record does not exist in the offeror service provider customer database 600, then the customer to be billed is not an existing customer of the offeror service provider, and a further test is performed during step 740 to determine if the customer account record meets the conditions set forth in the offer rules of any record in the offeror service provider rules database 400 that is associated with the offeror service provider. The conditions set forth in the offer rules may be, for example, financial or geographic constraints on the applicability of a given acquisition offer as described and illustrated above.

If it is determined during step 740 that the customer account record does not meet the conditions set forth in the offer rules, then the customer is not eligible to receive any acquisition offers and conventional billing processes are performed during step 730. If, however, it is determined during step 740 that the customer account record meets the conditions set forth in the offer rules, then the customer is eligible to receive an acquisition offer.

An acquisition offer is provided with the billing statement of an eligible potential new customer during step 750. The acquisition offer provides that the offeror service provider will make a specified payment on behalf of the customer to the billing statement issuer up to the offeror-defined maximum offer amount. In exchange, the customer agrees to become a customer of the offeror service provider. In one variation, the customer may be required to agree to become a customer of the offeror service provider for a predefined minimum period of time. As described above, numerous other acquisition offers may be formulated by the offeror service provider, depending on the needs and goals of the offeror.

The billing cycle process 700 receives a signal during step 760 indicating whether the customer has accepted the acquisition offer. The customer may indicate acceptance of the acquisition offer on the billing statement in many ways. For example, a check box may be printed on the statement for each acquisition offer. As used herein, the term "check box" refers to any portion of the billing statement that may be altered by the customer to indicate acceptance of a corresponding acquisition offer. To accept an acquisition offer, the customer may draw a check mark, draw a circle, sign their name, punch a hole, remove a latex scratch-off coating or otherwise alter the corresponding check box. The statement is returned, typically accompanying any additionally-required payment for the account. The returned statement is received and processed to determine whether any check box was altered.

The returned statement may be processed manually or by a machine. For example, predetermined locations of the billing statement corresponding to the check box locations may be optically scanned for indicia of acceptance by input device 270. A signal indicative of whether the acquisition offer was accepted is thereby generated. Alternatively, the statement may be read by a human operator, who in turn enters a signal indicative of whether the acquisition offer was accepted via input device 270. The data entry terminal may be a computer or other device that generates signals in accordance with user input.

Rather than indicating acceptance of an acquisition offer on a returned statement, the customer may also indicate whether the acquisition offer was accepted by transmitting signals via a telephone voice response unit (VRU) or other online interface. As is known in the art, voice response units (VRUs) allow an account holder to respond to queries and enter data by calling a predetermined telephone number and pressing one or more keys of a dual-tone multi-frequency (DTMF) keypad on his or her telephone. In such an embodiment of the present invention, the billing statement would be printed with a telephone number to call in order to indicate acceptance of one or more acquisition offers. Accordingly, the billing statement may further be printed with one or more codes for the account holder to enter (e.g. a unique account holder identifier).

Once the billing statement issuer has determined that the acquisition offer was accepted, the billing statement issuer then transmits a signal to the offeror service provider during step 770 (FIG. 7B) indicating that the customer has accepted the acquisition offer and that the offeror service provider has a new customer. Thereafter, the billing statement issuer receives a signal during step 780 from the offeror service provider indicating the transfer of funds to the billing statement issuer. The signal indicating the transfer of funds may be, for example, in the form of a confirmation of an electronic funds transfer (EFT), a promise to transfer the funds at a future time, or the signal may include an electronic currency. A description of different types of electronic currency may be found in Daniel C. Lynch, "Digital Money, The New Era of Internet Commerce," and Donald O'Mahoney et al, "Electronic Payment Systems." Finally, the billing cycle process 700 updates the amount due in the corresponding record of the billing statement issuer customer database 300 during step 790 in accordance with the received signal. Thereafter, the customer acquisition system 100 may optionally update the corresponding record of the offer status database 500 to indicate that the offer has been "accepted" and may update the corresponding customer's outstanding balance 345 in its own billing statement issuer customer database 300 in accordance with the received signal.

As previously indicated, FIG. 8 provides an illustrative billing statement 800 in accordance with the present invention. The billing statement 800 includes indicia 810 representing an acquisition offer that encourages the corresponding customer of the billing statement issuer to become a customer of the offeror service provider, in this case America Online (AOL). In exchange, AOL will make the minimum payment to the billing statement issuer on behalf of the customer. The billing statement 800 corresponds to customer record 310 of the billing statement issuer customer database 300 (FIG. 3). In addition, the acquisition offer 810 corresponds to the acquisition offer set forth in record 515 of the offer status database 500 (FIG. 5). As also shown by the record 515 of the offer status database 500 and record 615 of the offeror service provider customer database 600 (FIG.

6), the customer (Thomas Jones) accepted the acquisition offer 810, and became a customer of the offeror service provider (AOL).

It is to be understood that the embodiments and variations shown and described herein are merely illustrative of the principles of this invention and that various modifications may be implemented by those skilled in the art without departing from the scope and spirit of the invention.

We claim:

1. A computerized customer acquisition method comprising the steps of:

selecting a customer account record from an electronic customer account database of a first entity, said customer account record including a customer identifier;

determining if an individual indicated by said customer identifier is a customer of a second entity;

sending a billing statement from the first entity to said individual;

providing with the billing statement an offer to said individual to pay at least a portion of an amount due on said billing statement if said individual becomes a customer of said second entity;

receiving acceptance of said offer from said individual; and acquiring the individual as a customer by transferring said at least a portion of said amount to the first entity by the second entity.

2. The method of claim 1, further comprising the step of determining whether said individual satisfies predefined criteria for receiving said offer.

3. The method of claim 2, wherein said predefined criteria includes geographic conditions.

4. The method of claim 2, wherein said predefined criteria includes demographic conditions.

5. The method of claim 2, wherein said predefined criteria includes financial conditions.

6. The method of claim 1, wherein said customer account record further indicates an amount due and said method further comprises the step of determining whether said amount due satisfies predefined criteria for receiving said acquisition offer.

7. The method of claim 6, wherein said amount due is less than or equal to a maximum amount specified by said second entity.

8. The method of claim 1, wherein said individual must agree to remain a customer of said second entity for a predefined minimum period of time.

9. The method of claim 1, wherein said billing statement is a billing statement of said first entity and said offer is provided to said individual in said billing statement of said first entity.

10. The method of claim 1, further comprising the step of determining if said customer has accepted said offer.

11. A customer acquisition system comprising:

a memory for storing a customer account record of a first entity, said customer account record including a customer identifier;

a processor operatively coupled to said memory, said processor configured to:

select a customer account record;

determine if an individual indicated by said customer identifier is a customer of a second entity;

generate a billing statement from the first entity for said individual; and provide with the billing statement an offer to said individual to pay at least a portion of an account due on said billing statement if said individual becomes a customer of said second entity;

receive acceptance of said offer from said individual; and acquire the individual as a customer by transferring said at least a portion of said amount to the first entity by the second entity.

12. A computerized customer acquisition system comprising:

means for selecting a customer account record from an electronic customer account database of a first entity, said customer account record including a customer identifier;

means for determining if an individual indicated by said customer identifier is a customer of a second entity;

means for sending a billing statement from the first entity to said individual;

means for providing with the billing statement an offer to said individual to pay at least a portion of an amount due on said billing statement if said individual becomes a customer of said second entity;

means for receiving acceptance of said offer from said individual; and means for acquiring the individual as a customer by transferring said at least a portion of said amount to the first entity by the second entity.

13. An article of manufacture comprising:

a computer readable medium having computer readable code means embodied thereon, said computer readable program code means comprising:

a step to select a customer account record of a first entity, said customer account record including a customer identifier;

a step to determine if an individual indicated by said customer identifier is a customer of a second entity;

a step to generate a billing statement from the first entity for said individual; and a step to provide with the billing statement an offer to said individual to pay at least a portion of an amount due on said billing statement if said individual becomes a customer of said second entity.

* * * * *